United States Patent [19]

Shigenobu et al.

[11] Patent Number: 4,575,615
[45] Date of Patent: Mar. 11, 1986

[54] HOT WATER SUPPLYING DEVICE

[75] Inventors: Hiromichi Shigenobu; Takao Nakabayashi, both of Maebashi; Kitio Akiyama, Fujioka; Masao Miida, Numata; Hisashi Karasawa, Takasaki, all of Japan

[73] Assignee: Toshiba Electric Appliances Co., Ltd., Maebashi, Japan

[21] Appl. No.: 614,532

[22] Filed: May 29, 1984

[51] Int. Cl.⁴ .............................................. F24H 1/18
[52] U.S. Cl. .................................. 219/314; 219/324; 219/328; 99/279; 222/67
[58] Field of Search ............... 219/314, 321, 324, 323, 219/325, 328, 330, 316; 99/279, 281, 282, 283, 289 R; 222/52, 55, 56, 59, 61, 62, 64, 67, 146.5

[56] References Cited

U.S. PATENT DOCUMENTS

| | | | |
|---|---|---|---|
| 1,451,847 | 4/1923 | Rowe | 219/324 X |
| 2,840,681 | 6/1958 | Bok et al. | 219/324 X |
| 2,877,335 | 3/1959 | Relf | 219/324 |
| 3,383,495 | 5/1968 | Laube et al. | 219/321 |
| 3,468,292 | 9/1969 | Ferraro et al. | 219/314 X |
| 3,484,580 | 12/1969 | Morgan | 219/314 |
| 3,568,589 | 3/1971 | Robau | 99/283 |
| 3,641,918 | 2/1972 | Schellgell et al. | 99/279 |
| 4,144,999 | 3/1979 | Zebuhr | 219/314 X |
| 4,234,785 | 11/1980 | Lafebvre | 219/324 X |
| 4,252,254 | 2/1981 | Pryor | 222/67 |
| 4,480,173 | 10/1984 | Butterfield | 99/281 X |

Primary Examiner—C. L. Albritton
Assistant Examiner—M. M. Lateef
Attorney, Agent, or Firm—Oblon, Fisher, Spivak, McClelland & Maier

[57] ABSTRACT

A hot water supplying device is provided with a hot water supplying tank which includes first and second tank chambers. Warm water of about 85° C. is stored in the first tank chamber and hot water, which is higher in temperature than the warm water in the first tank chamber, is stored in the second tank chamber. The warm water in the first tank chamber is supplied to a coffee liquid making or percolating means by a pressure pump through a guide pipe. The guide pipe is introduced, on the way, into the hot water in the second tank chamber, whereby the warm water pressure fed from the first tank chamber through the guide pipe can be further heated by the heat of the hot water in the second tank chamber, and supplied to the coffee liquid making or percolating means.

11 Claims, 3 Drawing Figures

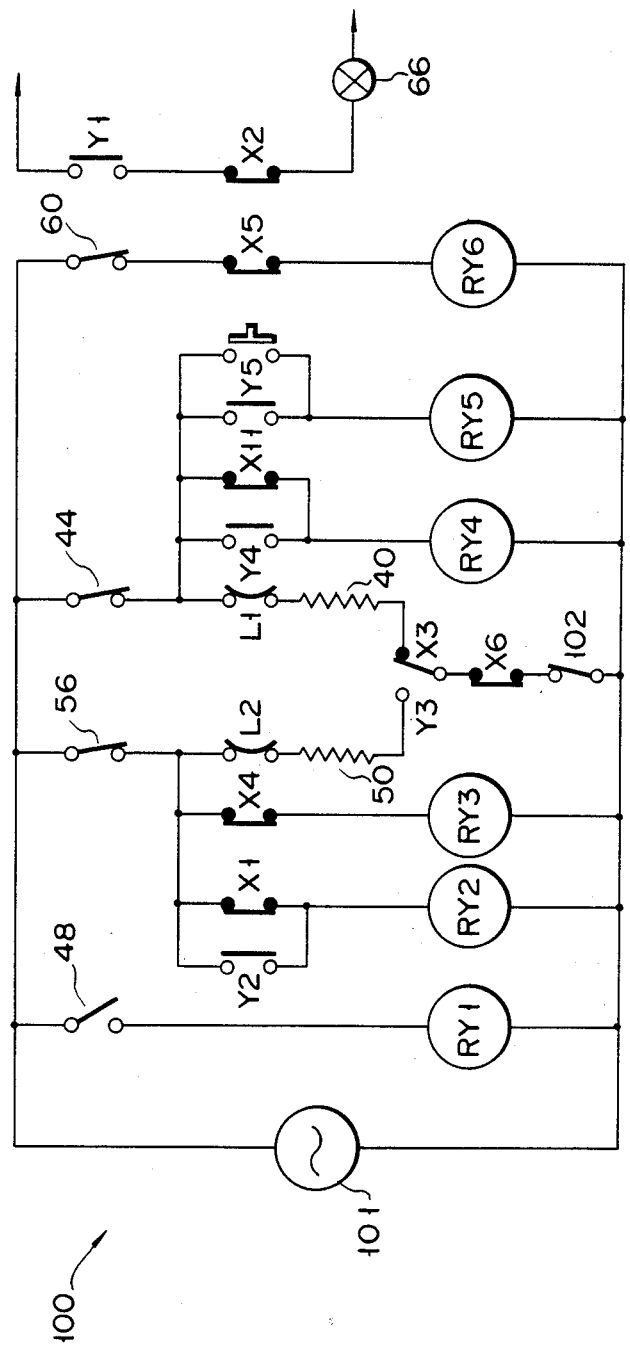
F I G. 2

HOT WATER SUPPLYING DEVICE

BACKGROUND OF THE INVENTION

The present invention relates to a hot water supplying device capable of supplying a predetermined amount of hot water to which the hot water is needed, and more particularly, it relates to a hot water supplying device most suitable for the automatic coffee vending machines.

The automatic coffee vending machine needs the hot water supplying device to make liquid coffee. The conventional hot water supplying device of this type comprises a tank into which water is introduced, a heater for heating the water in the tank, and a pump for feeding the water in the tank, which has been heated to a predetermined temperature by the heater. In the case of this conventional hot water supplying device, however, it was impossible to successively and repeatedly supply a predetermined amount of hot water having a temperature of about 100° C. and needed to make liquid coffee. This is because the temperature range of hot water allowed through the usual pressure pump was limited to lower than about 90° C.

Even when a pressure pump which can be used to pressure feed hot water of 100° C. is provided, the conventional hot water supplying device has the following drawbacks. A large amount of hot water must be stored in the tank to make it possible to successively supply a certain amount of hot water from the tank. An extremely large-sized and strong heater is therefore needed to heat speedily the large amount of water introduced into the tank due to supply the large amount of hot water from the tank, and to keep it hot. In this case, however, power consumed by the heater greatly increases, thereby making a cup of coffee vended by the machine expensive. In addition, the power supply source is practically a commercial one, thereby making it almost impossible to use the commercial power supply source for such large-sized and strong heater.

SUMMARY OF THE INVENTION

The object of the present invention is to provide a hot water supplying device capable of using the commercial power supply source and successively supplying a certain amount of hot water at low cost.

This object of the present invention can be achieved by a hot water supplying device comprising a tank means into which water is introduced and which includes a first tank chamber where the water introduced into the tank means is heated to a relatively low temperature and stored, and a second tank chamber where the water introduced is heated to a higher temperature than that of the warm water in the first tank chamber and stored; pump means provided with a pressure pump for successively feeding a certain amount of the warm water from the first tank chamber; and heater means for further heating the warm water fed from the first tank chamber by the pressure pump and provided with a guide pipe whose one end is connected to the discharge opening of the pressure pump, and whose other end is connected to which the hot water is needed, passing through the hot water in the second tank chamber which is higher in temperature than the warm water in the first tank chamber, whereby the warm water fed through the guide pipe can be further heated to a predetermined temperature by the heat of the hot water contained in the second tank chamber.

According to the hot water supplying device of the present invention, a certain amount of the warm water in the first tank chamber is fed by the pressure pump into the hot water in the second tank chamber through the guide pipe to heat the warm water to a predetermined temperature by the heat of the hot water in the second tank chamber, thereby enabling the warm water of relatively low temperature to be fed by the pressure pump. In the case of the present invention, therefore, the normal and cheap heatproof pressure pump can be employed. Also according to the present invention, the amount of hot water needed in the second tank chamber is enough only to heat a certain amount of the warm water fed from the first tank chamber to the predetermined temperature, thereby the amount of hot water, which must be contained in the second tank chamber, is small. This means that the heater whose power consumption is relatively small can be used to heat the water introduced into the second tank chamber to a high temperature and keep it to this temperature. The commercial power source can be used therefore as the power supply source for the heater. Also according to the present invention, the warm water to be heated by the heat of the hot water in the second tank chamber has been previously heated to the predetermined temperature, and the amount of heat deprived from the hot water in the second tank chamber to heat the warm water is therefore negligible. Accordingly, the fall in temperature of the hot water in the second tank chamber, caused by heat exchange with the warm water, is also negligible, thereby enabling the predetermined amount of hot water to be successively supplied.

Since the water introduced into the first tank chamber is heated to a relatively low temperature, compared with hot water in the second tank chamber, and kept only to this temperature, no large-sized heater is needed to heat the water in the first tank chamber and keep it heated. Further, even if the heaters are arranged in the first and second tank chambers, respectively, it is not necessary to supply current to both heaters at the same time. Since the heaters can be controlled to receive current independently, the commercial power supply source can be used as the power supply source for the both heaters, thereby reducing the cost needed to supply hot water.

This and other objects as well as merits of the present invention will become apparent from the following detailed description in reference to the accompanying drawings.

BRIEF DESCRIPTION OF THE DRAWINGS

FIG. 2 is a circuit diagram showing an electric circuit employed by the hot water supplying device shown in FIG. 1.

DETAILED DESCRIPTION OF THE PREFERRED EMBODIMENTS

Figure 1:
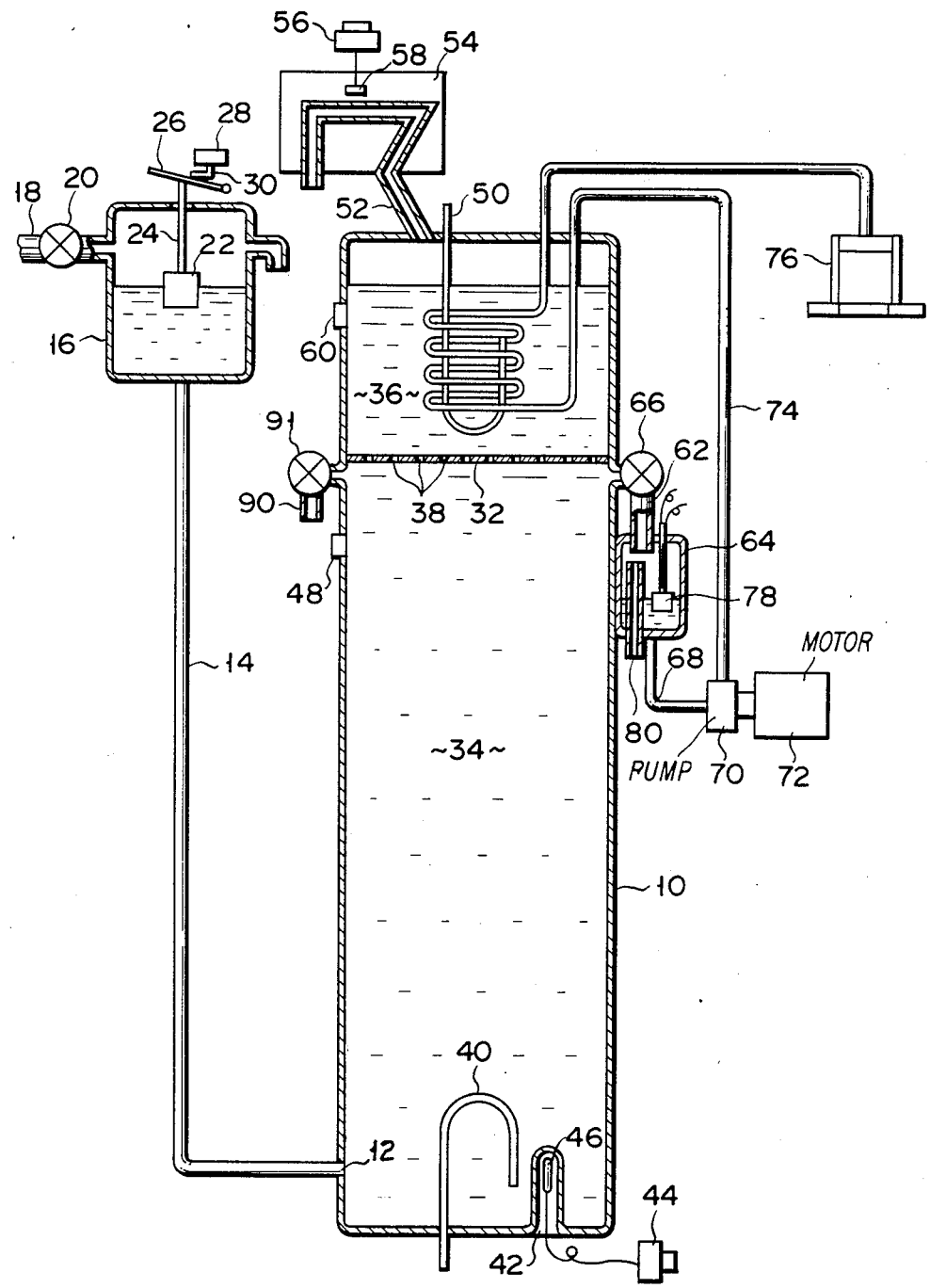
FIG. 1 is a sectional view roughly showing an example of the hot water supplying device according to the present invention.

Referring to FIG. 1, an example of the hot water supplying device according to the present invention is shown wherein it is applied to the automatic coffee vending machine. The hot water supplying device is provided with a hot water supplying tank 10 of the closed, hollow cylindrical type. The outer surface of the tank 10 is covered with a heat insulating material (not shown). Connected to the outer wall 12 of the lower end portion of the hot water supplying tank 10 is one end of a connector pipe 14, while the other end thereof is communicated with a cistern 16 located adjacent to the upper end portion of the hot water supplying tank 10, as shown in FIG. 1. One end of a water supply pipe 18 is connected to the outer top wall of the cistern 16 to communicated with the cistern 16, while the other end thereof to the water supply (not shown). An electromagnetic valve 20 is attached to the water supply pipe 18. A float 22 is floating on the water surface in the cistern 16. A float rod 24 is connected to the float 22. The float rod 24 extends upward and projects through the top wall of the cistern 16. That end of the float rod 24 which is projected from the top wall of the cistern 16 is connected to a swingable lever 26 which is supported and freely swingable, taking its one end as a fulcrum, as shown in FIG. 1. Arranged adjacent to the swingable lever 26 is a micro-switch 28 which serves to control the closing and opening of the electromagnetic valve 20 and which is changed over when the swingable lever 26 is swung upward to press an actuator 30 of the micro-switch 28. More specifically, the micro-switch 28 is adapted to close the electromagnetic valve 20 when the water surface in the cistern 16 reaches a predetermined level, and open it when the water surface is lower than a predetermined level. According to this cistern mechanism, therefore, water surface in the hot water supplying tank 10 can be adjusted to be the same level which is determined by the float 22 and the micro-switch 28, as that in the cistern 16.

The hot water supplying tank 10 is divided at the upper portion thereof by a partition wall 32 to a first tank chamber 34 located under the partition wall 32, and a second tank chamber 36 located on the partition wall 32. The partition wall 32 is provided with a plurality of apertures which allow water to flow from the first to the second tank chamber and vice versa. The partition wall 32 is not necessarily essential to the present invention.

A first electric immersion heater 40 is arranged at the lower portion of the first tank chamber 34 in the hot water supplying tank 10 to heat the water in the first tank chamber 34. A reseces 42 is formed on the outer bottom wall of the hot water supplying tank 10 and houses the heat sensitive portion 46 of a first heater controlling thermostat 44, contacted with or located adjacent to the outer wall of the hot water supplying tank 10. The first heater controlling thermostat 44 is changed over, depending upon the amount of heat detected by its heat sensitive portion 46. More specifically, the first heater controlling thermostat 44 is turned ON when the temperature of the water in the first tank chamber 34, mainly at the lower portion thereof, is lower than 60° C., for example, and OFF when the water temperature becomes higher than 90° C. Attached to the outer wall of the upper portion of the first tank chamber 34 is a first deciding thermostat 48 which serves to detect whether or not the water in the first tank chamber 34 is heated to a predetermined temperature. The first deciding thermostat 48 is turned OFF when the temperature of the water in the first tank chamber 34, mainly at the upper portion thereof, is lower than 85° C. and turned ON when the water temperature becomes higher than 85° C.

On the other hand, a second electric immersion heater 50 is also arranged in the second tank chamber 36 to heat the water therein. The second heater 50 extends in the second tank chamber 36 from the lower to the upper portion thereof. One end of a vapor discharging pipe 52 is connected to the top wall of the hot water supplying tank 10 to communicate with the second tank chamber 36, while the other end thereof extends and contacts with a heat receiving plate 54 located adjacent to the hot water supplying tank 10, the heat receiving plate 54 having excellent thermal conductivity. The heat sensitive portion 58 of a second heater controlling thermostat 56 is arranged adjacent to the vapor discharging pipe 52 on the heat receiving plate 54. The second heater controlling thermostat 56 is changed over, depending upon the amount of heat detected by its heat sensitive portion 58. More specifically, the second heater controlling thermostat 56 is turned ON when temperature in the vapor discharging pipe 52 is lower than 60° C., and OFF when the temperature exceeds 100° C. or the water in the second tank chamber 36 is boiled, causing vapor thus created to flow through the vapor discharging pipe 52. Also attached to the outer wall of the upper portion of the second tank chamber 36 is a second deciding thermostat 60 which serves to detect whether or not the water in the second tank chamber 36 is heated to a predetermined temperature. The second deciding thermostat 60 is turned ON when the temperature of the water in the second tank chamber 36 is lower than 63° C., and OFF when the water temperature becomes higher than 63° C.

As imaginable from the temperatures at which the first and second heater controlling thermostats 44 and 56 are changed over, the water in the second tank chamber 36 is heated to a higher temperature than the water in the first tank chamber 34 is.

One end of the discharge pipes 62 and 90, which serve to discharge the warm water in the first tank chamber 34, is communicated with the first tank chamber 34 through the outer wall of the hot water supplying tank 10, which is located almost at the uppermost end portion of the first tank chamber 34. The other end of the discharge pipe 62 extends downward to communicate with a metering container 64 through its top wall, the metering container 64 being attached to the outer wall of the hot water supplying tank 10. Both of the discharge pipes 62 and 90 are provided with electromagnetic discharge valves 66 and 91, which are opened at a certain time for a certain time period by means of their driver circuit (not shown). A certain amount of the warm water in the first tank chamber 34 is thus supplied to the metering container 64. One end of a sucking pipe 68 is communicated with the metering container 64 through its bottom wall, while the other end thereof is connected to the sucking side of a pressure pump 70, which is driven by a motor 72.

One end of a hot water guiding pipe 74 is connected to the discharging side of the pressure pump 70. The other end side of the hot water guiding pipe 74 extends into the hot water in the second tank chamber 36, which has been heated to a higher temperature than the warm water in the first tank chamber 34, passes through the top wall of the hot water supplying tank 10, encloses like a coil the second heater 50 in the second tank chamber 36, and again passes through the top wall of the hot water supplying tank 10 to be introduced into the brewing cylinder 76 in which liquid coffee is made. A float switch 78 is floating on the surface of the warm water in the metering container 64. This float switch 78 is used to stop the motor 72 when the warm water in the metering container 64 reaches a predetermined level. An overflow pipe 80 may be arranged in the metering container 64, if necessary.

An electric circuit 100 including the first and second heaters 40 and 50 and thermostats 44, 48, 56, and 60 will be described referring to FIG. 2. A first relay RY1 is connected to a commercial AC power source 101 via the first deciding thermostat 48. The second heater controlling thermostat 56 is connected, parallel to the first deciding thermostat 48, to the power source 101 via a usually-closed contact X1 of the first relay RY1 and a second relay RY2. As shown in FIG. 2, a self-sustaining contact Y2 of the second relay RY2 is connected parallel to the usually-closed contact X1. The first heater controlling thermostat 44 is connected, parallel to the first deciding thermostat 48 and the second heater controlling thermostat 56, to the AC power source 101 via another usually-closed contact X11 and a fourth relay RY4. A self-sustaining contact Y4 of the fourth relay RY4 is connected parallel to the usually-closed contact X11. A third relay RY3 is further connected to the AC power source 101 via the second heater controlling thermostat 56 and a usually-closed contact X4 of the fourth relay RY4. A fifth relay RY5, provided with a self-sustaining contact Y5, is connected to the AC power source 101 via the first heater controlling thermostat 44 and a starter switch SW of the push button type for the automatic coffee vending machine. A sixth relay RY6 is further connected to the AC power source 101 via the second deciding thermostat 60 and a usually-closed contact X5 of the fifth relay RY5.

The first heater 40 is connected to the power source 101 via the first heater controlling thermostat 44, a control thermostat L1 which serves to prevent the first heater 40 from overheating, and a usually-closed contact X3 of the third relay RY3. The second heater 50 is connected to the power source 101 via the second heater controlling thermostat 56, a control thermostat L2 which serves to prevent the second heater 50 from overheating, and a usually-opened contact Y3 of the third relay RY3. A series circuit which comprises a usually-closed contact X6 of the sixth relay RY6 and a thermostat 102 for preventing the hot water supplying tank 10 from being heated without water contained is interposed between a terminal common to the changeover contacts of the third relay RY3 and the AC power source 101. A driver circuit for controlling the current supply to the electromagnetic valve 66 is connected in series to a usually-opened contact Y1 of the first relay RY1 and a usually-closed contact X2 of the second relay RY2.

Referring to a timing chart shown in FIG. 3, the operation of the hot water supplying device having such an arrangement as described above will be described in a case where water supplied from the cistern 16 into the hot water supplying tank 10 is heated.

It is assumed that the water temperature in the hot water supplying tank 10, or in both of the first and second tank chambers 34 and 36, be 30° C. When a power source switch (not shown) for the automatic vending machine is turned ON at a time t0 in FIG. 3, current is supplied from the AC power source to the electric circuit. Since the water temperature in the hot water supplying tank 10 is 30° C. this time, each of the thermostats 56, 44 and 60 are turned ON, following the above-mentioned conditions. As the result, the second relay RY2 connected to the second heater controlling thermostat 56, the fourth relay RY4 connected to the first heater controlling thermostat 44, and the sixth relay RY6 connected to the second thermostat 60 are turned ON, respectively. As the second and fourth relays RY2 and RY4 are self-sustained by their self-sustaining contacts Y2 and Y4, they are kept ON unless the thermostats 56 and 44 are turned OFF. The usually-closed contact X6 of the sixth relay RY6 is therefore opened only when the power source switch is put ON, and current is not supplied to the first and second heaters 40 and 50.

When the push button type starter switch SW is turned ON at a time t1, the fifth relay RY5 is turned ON since the first heater controlling thermostat 44 is in the ON-condition. The fifth relay RY5 is self-sustained by its self-sustaining contact Y5 until the thermostat 44 is turned OFF. As the result, the usually-closed contact X5 of the fifth relay RY5 is opened and the sixth relay RY6 is turned OFF to thereby close its usually-closed contact X6. Current is supplied to the first heater 40 located at the lower end portion of the first tank chamber 34 in the hot water supplying tank 10, and the water in the first tank chamber 34 begins to be heated.

When water temperature in the second tank chamber 36 in the hot water supplying tank 10 reaches 63° C., the second deciding thermostat 60 is turned OFF. When the water temperature in the first tank chamber 34 rises thereafter and reaches 85° C. at a time t3, the first deciding thermostat 48 becomes ON to turn ON the first relay RY1. As the result, the usually-closed contacts X1 and X11 are opened, but the second and fourth relays RY2 and RY4 remain self-sustained. When the first deciding thermostat 48 is turned ON to control the opening and closing of the electromagnetic valve 91 shown in FIG. 1, the water of 85° C. in the first tank chamber 34 is ready for being supplied through the discharge pipe 90. The warm water fed through the discharge pipe 90 can be used to make cups of liquid instant coffee in the automatic vending machine.

When the water temperature in the first tank chamber 34 reaches 90° C., the first heater controlling thermostat 44 is turned OFF, and the fourth and fifth relays RY4 and RY5 are also turned OFF to close the usually-closed contact X4 of the fourth relay RY4. The third relay RY3 is thus turned ON and its changeover contact is changed over from its usually-closed contact X3 to its opened contact Y3. As the result, current supply to the first heater 40 is stopped, while current begins to be supplied to the second heater 50. When the fifth relay RY5 is turned OFF this time, its usually-closed contact X5 is closed, but since the second deciding thermostat 60 has been turned OFF at time t2, the sixth relay RY6 is kept ON.

When current is supplied to the second heater 50, water temperature in the second tank chamber 36 rises quickly and reaches the boiling point of 100° C. at a time t5. Vapor, created in the second tank chamber 36, is discharged outside through the vapor discharging pipe 52. When heat from the vapor flowing through the vapor discharging pipe 52 is transmitted to the heat sensitive portion 58 of the second heater controlling thermostat 56 through the heat receiving plate 54, the second heater controlling thermostat 56 is turned OFF by detecting with its heat sensitive portion the heat of 100° C. As a result, current supply to the second heater 50 is stopped. When the second heater controlling thermostat 56 is changed over to OFF, the second relay RY2, which has been self-sustained by this time, turns OFF, and the usually-closed contact X2 of the second relay RY2, inserted into the driver circuit for the electromagnetic valve 66, is closed. On the other hand, since the usually-opened contact Y1 of the first relay RY1 has already been closed at time t3 when the water temperature in the first tank chamber 34 reached 85° C., the whole of the driver circuit is closed. The electromagnetic valve 66 can be opened and closed responsive to a control signal applied from the control circuit (not shown).

When a coin is inserted into the automatic coffee vending machine in this state, the control signal is applied from the control circuit to the electromagnetic valve 66, thereby causing the electromagnetic valve 66 to be opened for a certain time period. When the valve 66 is opened for the certain time period, a certain amount of the warm water is supplied from the first tank chamber 34 into the metering container 64. Thereafter, a drive signal is applied from the control circuit to the motor 72 of the pressure pump 70 to drive the motor 72. Therefore, the warm water in the metering container 64 is introduced into the hot water supplying pipe 74, passing through the sucking pipe 68, and supplied to the liquid coffee making means 76 through the hot water supplying pipe 74. The warm water pressure fed through the hot water supplying pipe 74 is heated, on the way, to about 100° C. by the heat of the hot water in the second tank chamber 36, which is higher in temperature than the warm water, and then supplied to the liquid coffee making means 76. Namely, hot water of about 100° C., which is most suitable for making or percolating coffee, can be supplied from the hot water supplying tank 10 to the coffee liquid making or percolating means.

The pressure pump 70 is stopped by the float switch 78, which is changed over when the water surface in the metering container 64 becomes lower than the predetermined level. When the pressure pump 70 is driven again, therefore, it does not suck air because the warm water is still left in the metering container 64.

When the temperature of hot water in the second tank chamber 36 falls and no vapor is discharged from the second tank chamber 36, the second heater controlling thermostat 56 is again turned ON to supply current to the second heater 50. The temperature of hot water in the second tank chamber 36 can be thus held to about 98° C.-100° C. by intermittently repeating the current supply to the second heater 50 like this. On the other hand, the warm water in the first tank chamber 34 is not heated by the second heater 50, and its temperature can therefore be held to 90° C. or less, as described above.

Figure 3:
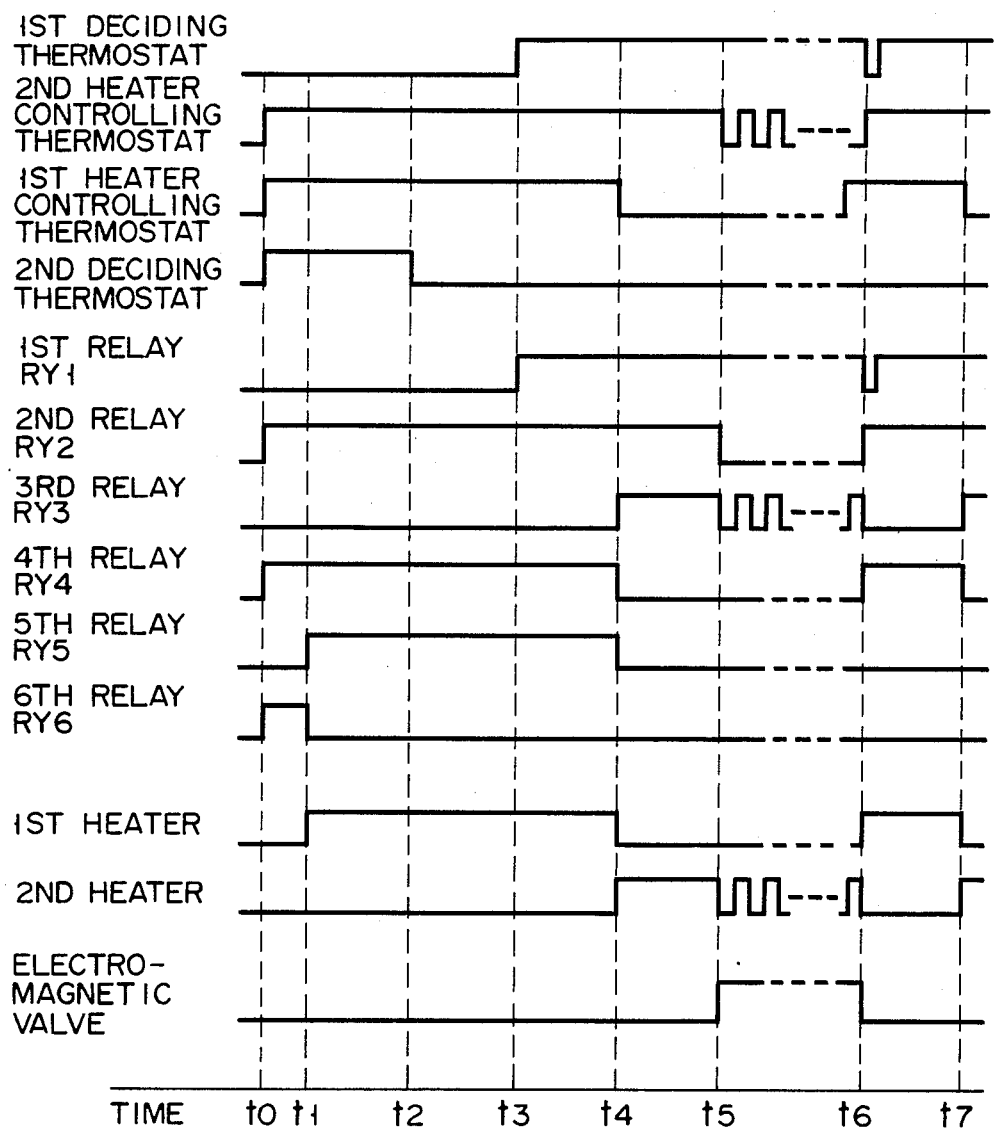
FIG. 3 is a timing chart showing the operation of the electric circuit shown in FIG. 2.

When the warm water is then successively taken out of the first tank chamber 34 in the hot water supplying tank 10, starting from time 5 as shown in FIG. 3, to make many cups of coffee liquid, the water surface level in the hot water supplying tank 10 or in the second tank chamber 36 falls. As the water surface level in the hot water supplying tank 10 falls, the water surface level in the cistern 16 also falls. When the water surface level in the cistern 16 is reduced below the predetermined value, the electromagnetic valve 20 is opened, as described above, to supply water into the cistern 16, so that the water surface in the cistern 16 or in the hot water supplying tank 10 can be returned to the predetermined level.

When water is supplied into the hot water supplying tank 10 through the water supplying opening 12, the temperature of the warm water in the first tank chamber 34 of this hot water supplying tank 10 falls. When the temperature of the warm water present at the lower end portion of the first tank chamber 34 becomes lower than 90° C., the first heater controlling thermostat 44 is turned ON, while the first deciding thermostat 48 is turned OFF when the temperature of the warm water present at the upper end portion of the first tank chamber 34 becomes lower than 85° C. at a time t6, as shown in FIG. 3. The opening and closing control for the electromagnetic valve 91 becomes inoperative at this time. When the first deciding thermostat 48 is turned OFF, the first relay RY1 is also turned OFF to close the usually-closed contacts X1 and X11, and the second and fourth relays RY2 and RY4 are thus turned ON. Therefore, the usually-opened contact Y1 and the usually-closed contact X2, inserted into the driver circuit for the electromagnetic valve 66, are opened. As a result, the hot water supply from the hot water supplying tank 10 into the coffee liquid making or percolating means 76 is stopped.

When the fourth relay RY4 is turned ON, the usually-closed contact X4 is opened and the third relay RY3 is turned OFF, thereby allowing the third relay RY3 to be changed over from its contact Y3 to its usually-closed contact X3. As a result, current supply to the second heater 50 is stopped, but current supply to the first heater 40 is started.

When the temperature of the warm water present at the upper end portion of the first tank chamber 34 falls to 85° C. at time t6, the warm water supply from the hot water supplying tank 10 is stopped, so that no water can be supplied into the hot water supplying tank 10 through the water supplying opening 12. The warm water in the first tank chamber 34 is heated from time t6 by the first heater 40 to raise its temperature again. Thereafter, the hot water supplying device repeats the operation which has been carried out, as described above, from time t3 to time t5.

When the power source switch is then opened, the current supply to the first and second heaters 40 and 50 is stopped. Therefore, the water temperature in the first and second tank chambers 34 and 36 of the hot water supplying tank 10 falls gradually. When the water temperature in the second tank chamber 36 falls below 63° C., the second deciding thermostat 60 is turned ON. Even when the power source switch is closed again, therefore, the current is not supplied to the first and second heaters 40 and 50 because the sixth relay RY6 has been turned ON to open its usually-closed contact X6. Namely, the starter switch SW must be operated to again supply current to the first and second heaters 40 and 50.

According to the above-described hot water supplying device of the present invention, current is not supplied to the first and second heaters 40 and 50 at the same time, even when they are arranged in the first and second tank chambers 34 and 36, respectively. Therefore, the AC power source for supplying current to them may have the capacity to supply current to one of them, thereby enabling the commercial power source to be used as the AC power source.

When a large amount of warm water is taken out of the first tank chamber 34 in the hot water supplying tank 10 for a short time period, and another large amount of cold water is introduced into the first tank chamber 34 to thereby lower the temperature of the warm water in the first tank chamber 34, the conditions under which the warm water in the first tank chamber 34 is again heated are same as those under which cold water is heated at the time of starting the automatic coffee vending machine, so that the time needed to heat the warm water in the first tank chamber 34 again can be shortened and the temperature raising characteristic of the water in the first tank chamber 34 can be usually held certain.

What is claimed is:

1. A hot water supplying device for heating water to a predetermined temperature and discharging hot water thus heated from said device, comprising:

a tank in which a tank chamber is defined;

water supplying means for supplying water into said tank such that a water surface in the tank is kept at a predetermined level, said water supplying means including a water supply pipe coupled to a lower side of said tank chamber;

upper and lower electric immersion heaters, disposed in upper and lower regions of said tank chamber, respectively, for heating the water in said tank chamber, the heat generated from said upper and lower heaters causing the water in said tank chamber to have different specific gravities, and the difference in specific gravity dividing said tank chamber into an upper tank region where hot water is stored and a lower tank region where warm water having a temperature lower than that of the hot water is stored;

feeding means for feeding the warm water from said lower tank region, said feeding means including a first supply pipe having one end connected to the lower tank region, a pressure pump having a sucking side connected to the other end of the first supply pipe, and a second supply pipe having one end connected to a discharge side of the pressure pump, said second supply pipe extending into the upper tank region and further extending to the outside of the upper tank region, whereby the warm water fed from the lower tank region through the first and second supply pipes is further heated by the heat of the hot water in the upper tank region; and adjusting means for adjusting said feeding means such that a constant quantity of warm water is supplied through said feeding means, said adjusting means including a metering container which is disposed in the first supply pipe and into which the warm water is introduced from said lower tank region, and a switch which produces a stop signal for stopping said pressure pump when said pressure pump has fed a predetermined quantity of warm water from the metering container through the second supply pipe.

2. A hot water supplying device according to claim 1, wherein said switch is a float switch disposed in the metering container, and said adjusting means further includes an electromagnetic valve disposed in the first supply pipe between the metering container and the lower tank region and adapted to introduce the warm water in the lower tank region into the metering container by opening/closing the first supply pipe, said electromagnetic valve being changed over in response to another signal produced from the float switch.

3. A hot water supplying device according to claim 1, wherein said lower heater is disposed in the lowermost region of the lower tank region.

4. A hot water supplying device according to claim 1, wherein said upper heater extends from the top of the upper tank region toward the bottom thereof.

5. A hot water supplying device according to claim 1, further comprising control means for permitting the upper and lower heaters to generate heat independently of each other without permitting them to generate heat at the same time.

6. A hot water supplying device according to claim 5, wherein said control means includes: at least one first thermostat for detecting the temperature of the warm water in the lower tank region and producing a signal representing the temperature of the warm water; at least one second thermostat for detecting the temperature of the hot water in the upper tank region and producing a signal representing the temperature of the hot water; and a current supply circuit for supplying a current to one of the upper and lower heaters on the basis of the signals produced from the first and second thermostats.

7. A hot water supplying device according to claim 1, wherein the upper and lower tank regions are partitioned by a partition wall which is provided with a plurality of apertures for allowing these two tank regions to be communicated with each other.

8. A hot water supplying device according to claim 6, wherein the first thermostat has a heat sensitive portion located adjacent to or in contact with the outer wall of the bottom of the tank to detect the temperature of the warm water which is present at the lower portion of the lower tank region.

9. A hot water supplying device according to claim 6, further comprising a vapor discharge pipe for allowing the vapor generated in the upper tank region to escape, and the second thermostat has a heat sensitive portion located adjacent to the vapor discharge pipe.

10. A hot water supplying device according to claim 1, wherein that portion of the second supply pipe introduced into the hot water in the upper tank region encloses the second electric immersion heater in a coil manner.

11. A hot water supplying device according to claim 2, wherein the float switch is adapted to generate the stop signal before the metering container is emptied of the warm water.

* * * * *